United States Patent

Niebergall et al.

[11] Patent Number: 6,028,145
[45] Date of Patent: Feb. 22, 2000

[54] BLENDED POLYOLIFIN THERMOPLASTIC HAVING IMPROVED NOTCHED IMPACT STRENGTH

[75] Inventors: Ute Niebergall; Jürgen Bohse; Britta Schürmann, all of Berlin; Wolfgang Grellmann, Halle/Saale, all of Germany

[73] Assignee: Hoechst Aktiengesellschaft, Germany

[21] Appl. No.: 08/854,992

[22] Filed: May 13, 1997

[30] Foreign Application Priority Data

May 15, 1996 [DE] Germany .............................. 196 19 625

[51] Int. Cl.⁷ .............................. C08L 23/10; C08L 23/02
[52] U.S. Cl. ............................................................. 525/240
[58] Field of Search ................................................ 525/240

[56] References Cited

U.S. PATENT DOCUMENTS

| | | | |
|---|---|---|---|
| 5,218,047 | 6/1993 | Schwager et al. | 525/88 |
| 5,288,806 | 2/1994 | Peacock | 525/240 |
| 5,656,696 | 8/1997 | Yamamoto | 525/240 |
| 5,750,645 | 5/1998 | Huang . | |
| 5,804,660 | 9/1998 | Whetten | 525/240 |

FOREIGN PATENT DOCUMENTS

| | | |
|---|---|---|
| 0 015 066 | 9/1980 | European Pat. Off. . |
| 0 462 373 A2 | 12/1991 | European Pat. Off. . |
| 0 462 448 | 12/1991 | European Pat. Off. . |
| WO 94/03538 | 2/1994 | WIPO . |

*Primary Examiner*—Christopher Henderson
*Attorney, Agent, or Firm*—Connolly Bove Lodge & Hutz

[57] ABSTRACT

The blends, according to the invention, of polyethylene and polypropylene having improved notched impact strength are distinguished by the fact that they contain a) from 36 to 64% by weight of isotactic propylene homopolymer, b) from 35 to 63% by weight of high density polyethylene (HDPE) and c) from 1 to 10% by weight of a random copolymer comprising from 75 to 85% by weight of ethylene units and from 15 to 25% by weight of propylene units, all stated percentages by weight being based on the total weight of the respective blend.

16 Claims, No Drawings

BLENDED POLYOLIFIN THERMOPLASTIC HAVING IMPROVED NOTCHED IMPACT STRENGTH

The present invention relates to blends of polyethylene and polypropylene having improved notched impact strength.

In industry, there is an increasing demand for economical thermoplastics which have good mechanical properties, in particular high fracture toughness in combination with balanced rigidity and strength properties, but which in particular can be processed under standardized conditions without problems to give shaped articles. The producers of raw materials attempt to meet this demand through copolymers or through elastomer-modified thermoplastics, which however leads to a very wide range of specifications in a disadvantageous manner.

Pure polypropylene proves to be extremely brittle at low temperatures. The prior art describes the modification of polypropylene with elastomers in order to improve the low-temperature impact strength. The toughness at low temperatures can also be improved by adding ethylene polymers (HDPE, LDPE, LLDPE).

Blends of the two thermoplastics polypropylene (PP) and polyethylene (PE) have long been known. Owing to the incompatibility of the two semicrystalline polymers, separation occurs in such blends after processing and may lead to joint line problems due to an unfavorable phase morphology, for example in an injection molded article.

It is also known that, for example, small amounts of PP as an impurity in HDPE (HD=high density) can considerably impair the properties of the finished articles. This plays a very important role in particular in the recycling of polyolefins.

On the other hand, EP-A 462 373 describes blends of general purpose polymers of ethylene and propylene which have a maximum polyethylene content of about 30% by weight, and EP-B 462 448 describes similar blends of the same individual components which have a maximum content of isotactic polypropylene of about 35% by weight and a content of a random propylene copolymer of at least 7% by weight or more. However, the blends described in the two publications are in need of improvement in terms of their rigidity and notched impact strength with simultaneously high MFR (MFR=melt flow rate according to ISO 1133).

It was therefore the object of the present invention to provide a blend which on the one hand is composed only of general purpose polymers but on the other hand has toughness and flow properties which go beyond the known level.

This object is achieved, according to the invention, by blends of the generic type stated at the outset, whose defining features are that they contain a) from 36 to 64% by weight of isotactic propylene homopolymer (iPP),
b) from 35 to 63% by weight of high density polyethylene (HDPE) and
c) from 1 to 10% by weight of a random copolymer comprising from 75 to 85% by weight of ethylene units and from 15 to 25% by weight of propylene units, all stated percentages by weight being based on the total weight of the respective blend.

Surprisingly, it was found that a blend which has a finely disperse interpenetrating phase morphology and an excellent combination of mechanical properties in terms of rigidity and notched impact strength can be prepared in the case of mixtures of the two incompatible individual components iPP and HDPE of suitable composition and flowability in the range from about 3:1 to 1:3.

According to the invention, a polypropylene having an isotactic index in the range from 95 to 98, determined by the heptane extraction method according to ISO 6427, is preferably used as the isotactic propylene homopolymer of the individual component a). The preferred polypropylene furthermore has an MFR in the range from 0.2 to 1.0 g/10 min, determined according to ISO 1133 under a weight of 5 kg and at a temperature of 190° C., preferably in the range from 0.3 to 0.7 g/10 min. The amount, preferred according to the invention, of isotactic propylene homopolymer is in the range from 40 to 60% by weight, in particular from 45 to 55% by weight, particularly preferably from 48 to 52% by weight.

According to the invention, an ethylene copolymer containing from 2 to 3% by weight of 1-olefins having 3 to 10 carbon atoms, preferably having 4 to 8 carbon atoms, which have an MFR in the range from 10 to 20 g/10 min, determined according to ISO 1133 under a weight of 21.6 kg and at a temperature of 190° C., preferably from 13 to 19 g/10 min, is preferred as HDPE of the individual component b). The HDPE amount preferred according to the invention is in the range from 40 to 60% by weight, in particular from 45 to 55% by weight, particularly preferably from 48 to 52% by weight.

According to the invention, an adhesion promoter comprising a copolymer having from 77 to 82% by weight of ethylene units and 18 to 23% by weight of propylene units and an MFR in the range from 0.5 to 2.0 g/10 min, determined according to ISO 1133 under a weight of 5 kg and at a temperature of 230° C., preferably from 0.7 to 1.5 g/10 min, is preferably used as the random copolymer of the individual component c). The amount, preferred according to the invention, of the random copolymer of the individual component c) is in the range from 3 to 6% by weight.

The blends according to the invention furthermore optionally contain a heat stabilizer based on sterically hindered amines or on phenolic antioxidants in an amount of from 0 to 0.8% by weight, preferably from 0.1 to 0.6% by weight.

The preparation of the blends according to the invention is carried out in conventional screw extruders whose barrel temperatures are expediently set in the range from 190 to 210° C., the resulting melt temperatures being in the range from 215 to 240° C.

The embodiments below are intended to illustrate the invention even more clearly for the person skilled in the art.

EXAMPLE 1

Various blends containing different amounts of components a) and b) were prepared at a temperature of 210° C. in a single-screw extruder from Krauss Maffei, which was equipped with a PE mixing screw. The individual amounts are shown in Table 1. Alternatively either the adhesion promoter comprising a random copolymer of 78% by weight of ethylene units and 22% by weight of propylene units was present as component c) in an amount of 5% by weight, based on the total weight of the blend, in the blends thus prepared or the adhesion promoter was completely absent, i.e. the blends consisted only of the components a) and b).

According to ISO 1133, the MFR values of the blends thus prepared were then determined under a weight of 5 kg and at a temperature of 190° C. and are shown in Table 1 below.

TABLE 1

Melt flow rate MFR 190/5

| PE in % | Melt flow rate in g/10 min | |
|---|---|---|
| 0 | 0.46 | |
| 5 | 0.44 | 0.45 |
| 10 | 0.45 | 0.46 |
| 15 | 0.46 | 0.48 |
| 20 | 0.47 | 0.49 |
| 30 | | 0.52 |
| 40 | | 0.52 |
| 50 | 0.53 | 0.54 |
| 60 | | 0.51 |
| 70 | | 0.48 |
| 80 | 0.43 | 0.46 |
| 85 | 0.41 | 0.43 |
| 90 | 0.4 | 0.42 |
| 95 | 0.4 | 0.4 |
| 100 | 0.38 | |

EXAMPLE 2

Standard test bars according to ISO/DIS 3167, type A, were produced from the blends according to Example 1 by injection molding at a temperature of 250° C. Investigation of the test bars under the electron microscope showed that a very finely disperse phase distribution of the components of the blends was present.

The notched impact strength of the test bars was then measured according to ISO 179/eA at room temperature; the results of the measurement are listed in Table 2 below.

TABLE 2

Notched impact strength ISO 179/1eA RT

Notched impact strength in kJ/m

| PE in % | without adhesion promoter | with adhesion promoter |
|---|---|---|
| 0 | 10.76 | |
| 5 | 17.25 | 27.02 |
| 10 | 17.41 | 28.01 |
| 15 | 15.49 | 30.12 |
| 20 | 17.78 | 34.28 |
| 30 | 15.93 | 40.72 |
| 40 | 19.2 | 76.27 |
| 50 | 24.85 | 98.55 |
| 60 | 29.11 | 83.39 |
| 70 | 26.83 | 74.26 |
| 80 | 18.21 | 41.4 |
| 85 | 14.87 | 31.76 |
| 90 | 17.34 | 29.68 |
| 95 | 15.16 | 26.39 |
| 100 | 18.34 | |

The measured values of Example 2 show that, in the range, according to the invention, of the amounts of the individual components of the three-component combination comprising a) isotactic polypropylene, b) HDPE and c) adhesion promoter, characteristic values which are well above those expected from the rules of mixtures or the initial toughness of the individual components were achieved.

EXAMPLE 3

Further standard test bars according to ISO/DIS 3167, type A, were produced from the blends according to Example 1, as in Example 2, by injection molding at a temperature of 250° C. The modulus of elasticity of these further test bars was then measured according to DIN 53457 at room temperature. The results of the measurement are shown in Table 3 below.

TABLE 3

Modulus of elasticity DIN 53457

| | Modulus of elasticity in | GPa |
|---|---|---|
| PE in % | without adhesion promoter | with adhesion promoter |
| 0 | 1.37 | |
| 5 | 1.42 | 1.28 |
| 10 | 1.45 | 1.28 |
| 15 | 1.42 | 1.27 |
| 20 | 1.39 | 1.25 |
| 30 | 1.31 | 1.15 |
| 40 | 1.24 | 1.11 |
| 50 | 1.13 | 1 |
| 60 | 1.04 | 0.93 |
| 70 | 0.96 | 0.86 |
| 80 | 0.87 | 0.79 |
| 85 | 0.85 | 0.74 |
| 90 | 0.84 | 0.71 |
| 95 | 0.8 | 0.72 |
| 100 | 0.77 | |

It was found, surprisingly, that characteristic values which agree well with the rules of mixture were achieved in the range, according to the invention, of the amounts of the individual components of the three-component combination comprising a) isotactic polypropylene, b) HDPE and c) adhesion promoter, with the result that the finely disperse phase morphology was evident.

We claim:

1. A blend of polyethylene and polypropylene having improved notched impact strength comprising
   a) an isotactic propylene homopolymer in an amount of from 45 to 55% by weight;
   b) a high density polyethylene (HDPE) in am amount of from 45 to 55% by weight; and
   c) a random copolymer comprising from 75 to 85% by weight of ethylene units and from 15 to 25% by weight of propylene units in an amount of from 1 to 10% by weight;
wherein all stated percentages by weight are calculated on total weight of the receptive blend.

2. The blend as claimed in claim 1, wherein a polypropylene having an isotactic index in the range of from 95 to 98, determined according to ISO 6427, is employed as the isotactic propylene homopolymer of the individual component a).

3. The blend as claimed in claim 2, wherein the polypropylene has an MFR in the range of from 0.2 to 1.0 g/10 min, determined according to ISO 1133 under a weight of 5 kg and at a temperature of 190° C.

4. The blend as claimed in claim 3, wherein the polypropylene has an MFR in the range of from 0.3 to 0.7 g/10 min, determined according to ISO 1133 under a weight of 5 kg and at a temperature of 190° C.

5. The blend as claimed in claim 1, wherein the amount of isotactic propylene homopolymer is in the range of from 48 to 52% by weight.

6. The blend as claimed in claim 1, wherein an ethylene copolymer containing from 2 to 3% by weight of 1-olefins having 3 to 10 carbon atoms is empolyed as HDPE of the individual component b).

7. The blend as claimed in claim 6, wherein 1-olefins having 4 to 8 carbon atoms are employed.

8. The blend as claimed in claim 1, wherein the HDPE of component b) has an MFR in the range of from 10 to 20 g/10 min, determined according to ISO 1133 under a weight of 21.6 kg and at a temperature of 190° C.

9. The blend as claimed in claim 8, wherein the MFR of the HDPE component is in the range of from 13 to 19 g/10 min.

10. The blend as claimed in claim 1, wherein the amount of HDPE is in the range of from 48 to 52% by weight.

11. The blend as claimed in claim 1, wherein an adhesion promoter comprising a copolymer composed of from 77 to 82% by weight of ethylene units and of from 18 to 23% by weight of propylene units is empolyed as the random copolymer of the individual component c).

12. The blend as claimed in claim 11, wherein the adhesion promoter has an MFR in the range of from 0.5 to 2.0 g/10 min, determined according to ISO 1133 under a weight of 5 kg and at a temperature of 230° C.

13. The blend as claimed in claim 12, wherein the MFR of the adhesion promoter lies within the range of from 0.7 to 1.5 g/10 min.

14. The blend as claimed in claim 11, wherein the amount of the adhesion promoter is in the range of from 3 to 6% by weight.

15. The blend as claimed in claim 1, comprising additionally a heat stabilizer based on sterically hindered amines or on phenolic antioxidants in an amount of from 0 to 0.8% by weight.

16. The blend as claimed in claim 15, wherein the amount of stabilizer lies within the range of from 0.3 to 0.7% by weight.

* * * * *